July 17, 1962 W. B. CATHEY Re. 25,198

SPRING GUIDE BOX FRONT FOR LOOM SHUTTLE BOX

Original Filed June 6, 1957 2 Sheets-Sheet 1

William B. Cathey
INVENTOR.

BY Clarence A. O'Brien and Harvey B. Jacobson
Attorneys

SPRING GUIDE BOX FRONT FOR LOOM SHUTTLE BOX

Original Filed June 6, 1957 2 Sheets-Sheet 2

William B. Cathey
INVENTOR.

BY Clarence A. O'Brien and Harvey B. Jacobson
Attorneys

United States Patent Office

Re. 25,198
Reissued July 17, 1962

25,198
SPRING GUIDE BOX FRONT FOR LOOM SHUTTLE BOX

William B. Cathey, Centerville School Section, Anderson, S.C.

Original No. 2,948,303, dated Aug. 9, 1960, Ser. No. 663,978, June 6, 1957. Application for reissue Feb. 7, 1962, Ser. No. 173,087
7 Claims. (Cl. 139—185)

Matter enclosed in heavy brackets [ ] appears in the original patent but forms no part of this reissue specification; matter printed in italics indicates the additions made by reissue.

This invention comprises a novel and useful spring guide box front for loom shuttle boxes and more particularly relates to an attachment for the front wall of a loom shuttle box to yieldingly urge the shuttle against one side of the box and thus guide the shuttle in its movement into and out of the box.

The primary purpose of this invention is to provide a simple, inexpensive, and easily installed attachment which may be applied to conventional loom shuttle boxes and which will guide the shuttle in its motion into and out of the box to thereby cause the flight of the shuttle to be truer, and reduce the tendency of the shuttle to rubboard, that is strike against the reed during the travel of the shuttle.

A further object of the invention is to provide an attachment in accordance with the foregoing object which will appreciably reduce the wear upon the shuttle and lengthen its life, and will similarly preserve and protect the leather covers on the shuttle box front.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In the flying shuttle type of loom, having a shuttle box at each side of the lay, considerable difficulty is encountered by reason of the failure of the shuttle to exactly follow its predetermined path of travel from one shuttle box to the other. A frequent source of such erratic travel arises from the fact that there is some lost motion of the shuttle in its box so that when the shuttle is thrown by the picker to the other side of the lay and into the other shuttle box, it is not properly guided in its flight.

The present invention provides a leaf spring device which may be applied to the front wall of conventional shuttle boxes in order to resiliently urge the shuttle against the back wall and thus maintain the shuttle in a fixed position in preparation for the next picking motion of the loom.

Figure 1:
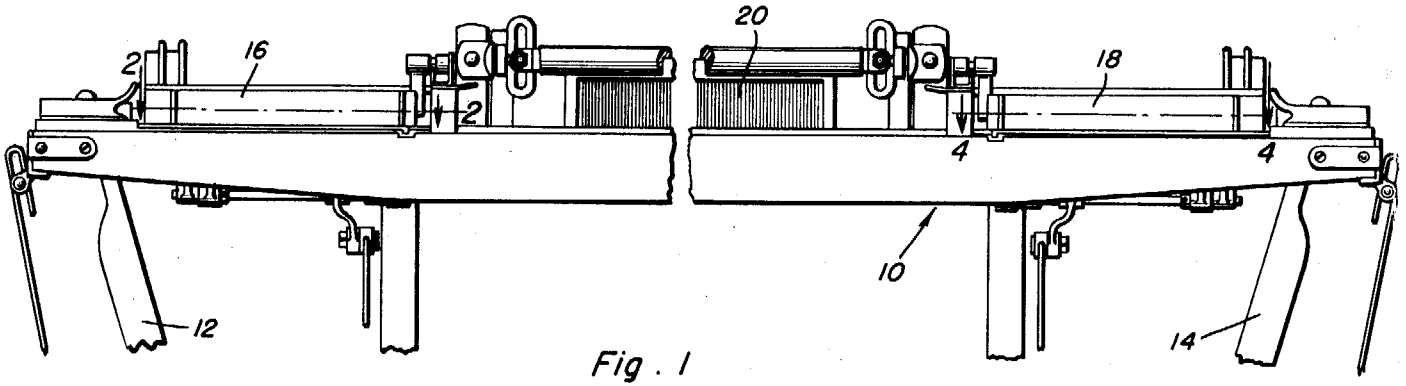
FIGURE 1 is a fragmentary front elevational view showing a portion of a loom lay with the shuttle boxes thereon, and showing the reed and a portion of the picker stick assembly.

Referring first to FIGURE 1 of the drawings there is shown a portion of a conventional loom having the lay 10 with the usual picker sticks 12 and 14 together with shuttle boxes 16 and 18, the reed being shown at 20. In the type of loom shown the shuttle boxes 16 and 18 are of slightly different construction, as will be apparent from a comparison of FIGURES 2 and 4. In the operation of the loom, the picker mechanism hurls a shuttle shown in dotted lines at 22 in FIGURES 2 and 4 back and forth across the lay of the loom from one shuttle box to the other, the shuttle carrying with it a bobbin or spool of thread, not shown, to form the filling of the fabric being woven by the loom.

Figure 2:
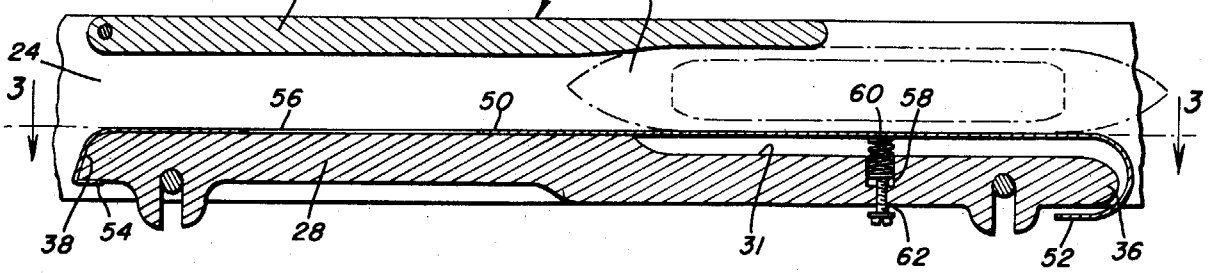
FIGURE 2 is a horizontal sectional view taken on an enlarged scale substantially upon the plane indicated by the section line 2—2 of FIGURE 1 and showing the left shuttle box of the loom with the attachment of this invention applied thereto.
Figure 4:
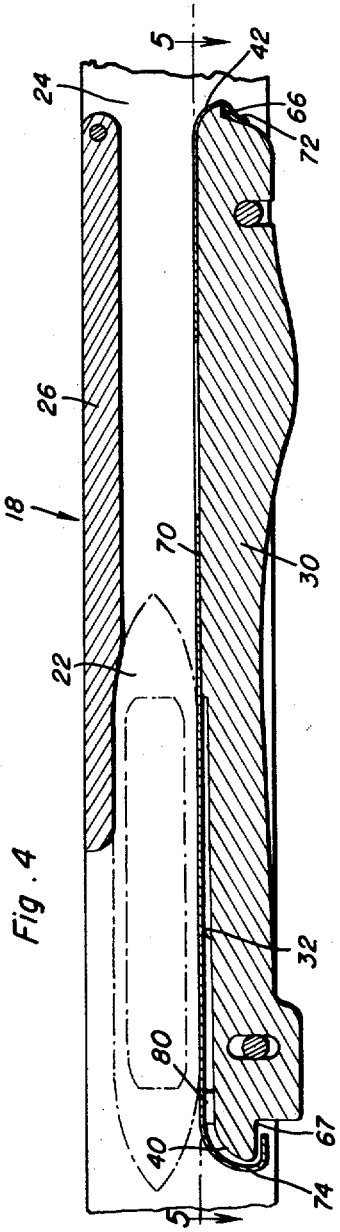
FIGURE 4 is a horizontal sectional view taken on an enlarged scale substantially upon the plane indicated by the section line 4—4 of FIGURE 1 and showing the right hand shuttle box of the loom with the attachment of this invention applied thereto.

Referring now more specifically to FIGURES 2 and 4, it will be observed that each of the shuttle boxes has a bottom wall 24 which may comprise the top surface of or be carried by the lay 10 together with a back wall 26 and a front wall 28 and 30 for the boxes 16 and 18, respectively. As will be observed, each front wall has an end portion projecting beyond the adjacent end of the back wall 26, and extending towards the center of the lay, and each extending end portion is provided with a recessed or cut away portion such as that indicated at 31 in the shuttle box 16 of FIGURE 2, and at 32 in the shuttle box 18 of FIGURE 4. Each of the front walls of the two boxes is provided with rounded end portions as at 36 and 38 for the shuttle box 16 and 40 and 42 for the shuttle box 18.

Figure 3:
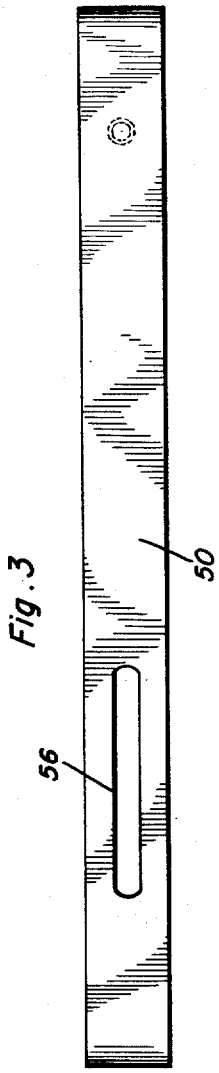
FIGURE 3 is an elevational view taken substantially upon the plane indicated by the section line 3—3 of FIGURE 2 and showing the attachment itself.
Figure 5:
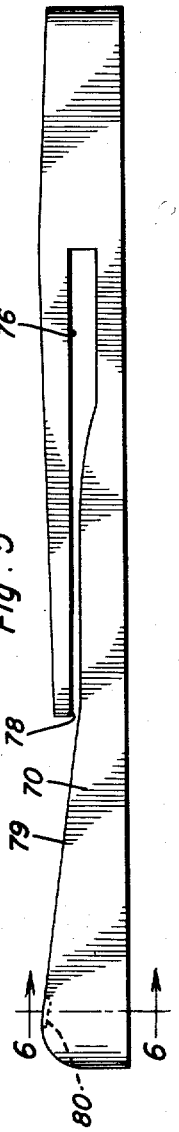
FIGURE 5 is a vertical sectional view taken substantially upon the plane indicated by the section line 5—5 of FIGURE 4 and showing the spring device in accordance with this invention.

Referring now more specifically to FIGURES 2 and 3, it will be observed that the present invention includes an attachment which is applied to the front wall of the shuttle box for yieldingly and resiliently urging the shuttle 22 towards and against the back wall whereby to ensure accurate travel of the shuttle as the same is thrown from the shuttle boxes across the lay of the loom.

The attachment for the box 16, as apparent from FIGURES 2 and 3 comprises a flat thin metal strip constituting a leaf spring 50 which has its opposite end portions inturned upon themselves as at 52 and 54 to provide pockets which open towards each other and which are adapted to embrace the rounded ends 36 and 38 of the front wall 28 as shown in FIGURE 2.

It will be observed that while the pocket at the inturned end 54 snugly grips the rounded portion 38, the inturned end 52 is loosely received upon the rounded end 36 to thus provide a clearance for relative lateral movement of that end of the leaf spring relative to the end portion 36 and the recess 31.

It will be further seen from FIGURE 3 that the leaf spring 50 is provided with a longitudinally extending slot 56 therein which is adapted to register with a corresponding slot, not shown, in the front wall 28 to permit insertion of the feeler mechanism of the loom which automatically detects the exhausting of the supply of yarn carried by the bobbin of the shuttle in order that the automatic replacing mechanism of the loom may function to remove the exhusted bobbin and insert a fresh one in the shuttle.

Referring again to FIGURE 2 it will be seen that the front wall 28 adjacent its projecting portion is provided with a chamber 58 therein receiving a compression coil spring 60 which abuts against the leaf spring 50. An adjusting screw 62 is threaded through the front wall 28 and abuts against the end of the coil spring 60 for adjusting the tension thereon. As will be now understood, adjustment of the screw 62 serves to apply any desired amount of resilient force to the leaf spring 50 to urge the same towards the rear wall 26 and thus provide an adjusted resilient clamping action upon the shuttle [24] *22*.

The front wall 30 of the other shuttle box 18 is of slightly different construction, and at what may be termed its outward end is provided with a shoulder 66 the other end having a shoulder 67. The leaf spring 70, as in the embodiment for the other shuttle box is likewise provided with inturned portions 72 and 74, the former embracing the rounded end 42 and engaging beneath the shouldered portion 66 of the front wall, while the end portion 74 overlies the other rounded end portion of and embraces the shoulder 67 of the front wall 30. As will be seen, the pocket formed by the inturned portion 72 provides a loop snugly embracing the rounded end 42 of the front wall 30, while the inturned portion 74 provides a pocket which loosely embraces the rounded portion 40 for lateral movement relative thereto.

The spring 70 is also provided with a longitudinally extending slot 76, which in this form opens as at 78 to an inclined and recessed edge 79 of the leaf spring. This slot also serves to permit operation of the conventional loom thread cutter mechanism. The last of the thread is pulled through the slot 76 by the thread setter, is slipped and falls outside the shuttle box when the filling is changed. The box front wall 30 has a seat therein, not shown, with which the slot 76 registers. The curved portion 74 of the spring 70 acts as a safety to prevent the end of the spring from moving in front of the shuttle in the event of breakage of the spring, thereby allowing the shuttle to finish its flight without obstruction. The recesses 31, 32 allow the springs 50 and 70 to perform their previously described functions and yet provide a solid wall behind the springs in the event of possible breakage.

Figure 6:
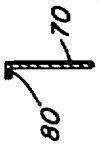
FIGURE 6 is a vertical transverse sectional detail view taken substantially upon the plane indicated by the section line 6—6 of FIGURE 5.

On the spring 70 there is formed as shown in FIGURE 6 an inturned flange or lip 80 which is adapted to rest against the front wall and thus prevent the thread from getting back into the shuttle box after it has been caught and brought through the slot [74] *76* by the action of the thread cutter.

It will thus be seen that there has been provided a resilient attachment for each of the conventional shuttle box structures of a loom which will yieldingly urge the shuttle against the rear wall thereof and thus ensure that the shuttle shall leave its shuttle box in a predetermined line of flight and yet will permit the functioning of the filler and thread cutter in their normal manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination of a loom shuttle box including an elongated back wall and an elongated front wall spaced from said back wall, said front wall having an outer end and an inner end portion projecting longitudinally beyond the corresponding inner end of the back wall, and means for guiding a shuttle into said box and resiliently urging the same against the back wall of the box, said means comprising a flat shuttle engaging leaf spring disposed at the rear surface of said front wall, said spring having a forwardly and inwardly turned outer end embracing and anchored to the outer end portion of the front wall, the inner end portion of said spring being resiliently urged away from the front wall toward the back wall, said spring having a forwardly and outwardly turned inner end loosely embracing the inner end of the front wall to permit movement of the spring toward the back wall, and said turned inner end of the spring being engageable with the front surface of the front wall to limit the movement of the spring toward the back wall.

2. The combination as defined in claim 1 wherein the rear surface of the inner end portion of said front wall is recessed to provide clearance between the inner end portion of the front wall and said spring and permit flexing of the inner end portion of the spring into the recessed portion of the front wall.

3. The combination as defined in claim 1 wherein the rear surface of the inner end portion of said front wall is recessed to provide clearance between the inner end portion of the front wall and said spring and permit flexing of the inner end portion of the spring into the recessed portion of the front wall, and means cooperating with the front wall and with said spring for limiting the flexing of the spring into the recessed portion of the front wall.

4. The combination as defined in claim 3 wherein said limiting means comprise a screw-threadedly adjustable limiting element provided in the recessed portion of said front wall and engaging said spring.

5. The combination as defined in claim 3 wherein said limiting means comprise an adjusting screw provided in the recessed portion of said front wall, and a compression coil spring interposed between said screw and said leaf spring.

6. The combination as defined in claim 3 wherein said limiting means comprise a forwardly projecting flange provided on the inner end portion of said spring and engageable with the recessed portion of said front wall.

*7. In a loom shuttle box having an elongated back wall and an elongated front wall spaced from said back wall, the improvement including, a flat shuttle engaging leaf spring disposed at the rear surface of said front wall, means anchoring said spring to the outer end portion of the front wall, the rear surface of the inner end portion of said front wall having a recess providing clearance between the inner end portion of the front wall and said spring permitting flexing of the inner end portion of the spring into the recessed portion of the front wall, and a forwardly and outwardly turned inner end portion carried by the spring receiving the shuttle.*

References Cited in the file of this patent or the original patent

UNITED STATES PATENTS

| | | |
|---|---|---|
| 550,596 | Cowgill | Dec. 3, 1895 |
| 880,602 | Tilch | Mar. 3, 1908 |
| 1,482,800 | Larin | Feb. 5, 1924 |
| 1,566,721 | Ayotte | Dec. 22, 1925 |
| 1,568,654 | Chalmers et al. | Jan. 5, 1926 |
| 2,736,340 | Selles | Feb. 28, 1956 |